United States Patent [19]

Lowe et al.

[11] Patent Number: 4,734,393
[45] Date of Patent: Mar. 29, 1988

[54] NON-CLAY OIL AND GREASE ABSORBENT

[75] Inventors: H. Edward Lowe, Cassopolis, Mich.; Ricky L. Yoder, Elkhart; Clayton C. Nelson, Granger, both of Ind.

[73] Assignee: H. Edward Lowe, Cassopolis, Mich.

[21] Appl. No.: 746,748

[22] Filed: Jun. 20, 1985

[51] Int. Cl.$^4$ .......................... B01J 20/00; C09K 3/22
[52] U.S. Cl. ..................... 502/404; 162/100; 162/DIG. 9; 252/88; 502/401
[58] Field of Search ............................. 252/88, 174.25; 210/501.2, 505, 924; 162/DIG. 9, 100; 502/400, 401, 403, 404

[56] References Cited

U.S. PATENT DOCUMENTS

| | | | |
|---|---|---|---|
| 622,054 | 3/1899 | Marsden | 502/404 |
| 892,754 | 7/1908 | May | 252/88 |
| 907,403 | 12/1908 | Redfearn | 252/88 |
| 966,060 | 8/1910 | Severns | 252/88 |
| 1,758,735 | 5/1930 | Conrad | 252/88 |
| 2,198,013 | 4/1940 | Olcott | 252/88 |
| 3,723,321 | 3/1973 | Thomas | 252/88 |
| 4,263,873 | 4/1981 | Christianson | 119/1 |
| 4,343,680 | 8/1982 | Field et al. | 162/100 |
| 4,356,060 | 10/1982 | Neckermann et al. | 162/181.6 |
| 4,497,688 | 2/1985 | Schaefer | 162/181.1 |
| 4,537,877 | 8/1985 | Ericsson | 502/402 |
| 4,551,253 | 11/1985 | Grenthe | 210/680 |
| 4,560,527 | 12/1985 | Harke et al. | 264/500 |

FOREIGN PATENT DOCUMENTS

| | | |
|---|---|---|
| 2358808 | 6/1975 | Fed. Rep. of Germany . |
| 3343965 | 12/1984 | Fed. Rep. of Germany . |
| 45595 | 4/1977 | Japan . |
| 62189 | 5/1977 | Japan . |
| 51662 | 5/1978 | Japan . |
| 7840 | 1/1980 | Japan . |
| 7706339 | 12/1977 | Netherlands . |
| 293892 | 7/1928 | United Kingdom . |

OTHER PUBLICATIONS

Research Disclosure, 10129, Sep. 1972, p. 17.

*Primary Examiner*—Prince E. Willis
*Attorney, Agent, or Firm*—Thomas J. Dodd

[57] ABSTRACT

An oil and grease absorbent material formed from treated paper sludge or other fibrous slurries and a method of treating the slurry to form the material which includes the physical properties of clay absorbents. The method involves the addition of materials to the shredded slurry to control color, bacteria, fungi, and density. A quantity of lipophyllic ray cells are added to the slurry to increase oil absorbency. The slurry is then formed into granules and dried before packaging.

16 Claims, No Drawings

NON-CLAY OIL AND GREASE ABSORBENT

SUMMARY OF THE INVENTION

This invention relates to a granular absorbent used for the collection and control of oil and grease and the method of producing the absorbent.

Oil and grease absorbent is an industrial, and household commodity known to the vast majority of individuals who deal with such things as engine and equipment repair or with vehicle storage areas. It is used primarily as a surface application to collect and contain fugitive oil and grease. Previous oil and grease absorbents were formed of naturally occurring absorbent materials such as clay and sand. Other materials which were utilized as oil and grease absorbents were wood chips, sawdust, peanut shells, rice hulls, shredded paper or cardboard and newsprint and a vast array of natural, synthetic and semi-synthetic inorganic and organic polymers. The problems with these materials were low absorbency, fugitive dust which damaged equipment and associated disposal problems.

The absorbent of this invention can be formed from the many types of plant fiber such as citrus pulp, sugar cane, sugar beets, potatoes, grain and paper sludge. The fibers derived from primary or secondary wood pulp or sludge are preferred. More specifically, the preferred fibers are derived from a sulfate pulp or a primary paper sludge which incorporates additional parenchyma ray cells to enhance the oil and grease absorbency of the sludge after granulation. Ray cells are those lipophilic cambium cells associated with the storage of starch and oils. They are normally extracted from wood fiber during the pulping process in order to produce paper with greater water absorbtion characteristics. Although it is recognized that many organic or inorganic polymers could be incorporated into this invention, for the enhancement of the oil and grease absorbency, ray cells are the preferred additive because of their wood pulp fiber derivation and biodegradability. Additionally, other chemicals and minerals could be incorporated into the raw sludge before drying which would allow the finished product to mimic the appearance and general physical properties of a clay-based oil and grease absorbent. The method allows the formation of a granule of high lipophilic absorbency which is virtually dustless and may be incinerated for fast disposal. Furthermore, the method of this invention allows the formation of a paper based oil and grease absorbent which resembles a clay-based absorbent in substantially all respects and allows accurate control of granule size, color, density and other physical properties.

Accordingly, it is an object of this invention to provide for a novel granular absorbent material which can be used for either household or industrial use.

Another object of this invention is to provide an oil and grease absorbent which is economical to produce, dustless and may be incinerated for quick disposal.

Another object of this invention is to provide for a paperbased oil and grease absorbent which resembles a clay-based absorbent.

Another object of this invention is to provide an oil and grease absorbent which has excellent physical properties.

Another object of this invention is to provide for a novel method of producing an oil and grease absorbent.

Still another object of this invention is to provide for a method of producing an oil and grease absorbent which allows accurate control of the physical properties of the absorbent.

Other objects of this invention will become apparent upon a reading of the following description.

DESCRIPTION OF THE PREFERRED EMBODIMENT

The preferred product and method herein described is not intended to be exhaustive or to limit the invention to the precise form or steps described. They are chosen and described to explain the principles of the invention and its application and practical use to enable others skilled in the art to utilize the invention.

An understanding of the absorbent product of this invention may be obtained by following the procedures below disclosed. The primary materials utilized are the waste materials from paper manufacture which are commonly referred to as paper sludge and ray cells. Other slurries of fibrous plant materials such as sugar beet, sugar cane, citrus pulp, grain and potato may be used. Three basic types of paper sludge which may be used are primary process, primary de-inked, and secondary process or de-inked. The preferred sludge for the absorbent is primary process sludge. Primary process sludge is the waste material from the manufacture of a sulfate based paper having a content of about 75%–99% fiber and 1%–25% filler (e.g. kaolin, barytes, titanium dioxide, other plant fibers, etc.). The inclusion of wood derived ray cells are also part of the preferred process. The ray cells are incorporated with the sludge after to sludge dewatering to a preferred content range of 10%–90% ray cells and 90%–10% plant fiber. The preferred product will include 50% ray cells and 50% plant fiber.

Paper pulp sludge and ray cell slurry in raw form are each approximately 90% water. The raw sludge or slurry is analyzed for composition and bacteria. It is then dewatered by any accepted method (usually pressing or centrifuging) until it contains approximately 40%–50% solids, with 45% solids being preferred. In this dewatered stage, the paper sludge fiber is broken down or shredded by any conventional method (e.g. delumper, reduction mill or shredder) to a fiber length of 1 mm–10 mm. Such preferred equipment is a Fitzpatrick Mill. The preferred fiber length is 1 mm–4 mm.

The dewatered fiber and ray cells then undergo a quality adjustment which generally involves the addition of additives such as dye, titanium dioxide or barytes to adjust color; biocide or slimacide to control bacterial and fungal growth; and kaolin clay or barytes to increase density.

The biocide or slimacide is generally formed of one of the following: quaternary ammonium salts, aldehyde derivatives, halogenated styrenes, thiocyanates, carbamates, azo chlorides, and modified phenols. Halogenated styrenes and thiocyanates are preferred. More specifically preferred is a mixture of bromonitrostyrene and methylene bisthiocyanate such as Slime-Trol ® RX-41 sold by Betz Paperchem, Inc.

After the quality adjustment, the sludge and slurry mixture is agglomerated or granulated by any standard method which may include drum pelletizer, disk pelletizer, pinmill, extruder or granulator. The sludge and slurry mixture is then formed into spherical pellets or, preferably, granule shapes. Should spherical pellets be formed they are flattened into a granular shape by a standard compaction device. The product is then dried until the granule contains 1%-10% moisture by weight. Drying is accomplished in any standard dryer such as a fluid bed dryer, turbo dryer, belt dryer or tray dryer at a temperature range of 200°-750° F. After drying, color may be added. The product is then packaged and sold as an oil and grease absorbent or similar product.

The following examples are submitted to better understand the process and product.

EXAMPLE 1

Primary process sulfate sludge from Great Northern Paper Company was found to have a moisture content of 81.6%, a fiber content of 73.19% and a filler content of 26.81%. The sludge was placed in an Eirich RX-7 high intensity mixer where it was dewatered and shredded to a fiber size of 1 mm-10 mm. Shredding took place at approximately 45% moisture content of the sludge. The sludge was then removed from the mixer and placed in a Mars mineral drum pelletizer for granule formation. This took place at approximately 50% moisture content of the sludge. The granules were removed from the pelletizer and placed in a rotary type dryer at 300° F. and were dried until the moisture content of the sludge was approximately 5.78%. The sludge was removed from the rotary type dryer and found to have a bulk density of 14.31 pounds/cubic feet. The granules were then screened and the following results obtained:

| | U.S. Mesh | % Retained |
|---|---|---|
| | 6 | 24.37 |
| | 8 | 26.18 |
| | 12 | 22.01 |
| | 20 | 25.34 |
| | 30 | 1.47 |
| | 40 | 0.33 |
| | 60 | 0.20 |
| less than | 60 | 0.10 |

The granules were then tested for water and oil absorption and found to absorb 1.46 ml/gm of water or 146% weight to weight absorbency, and 1.18 ml/gm of oil or 102.8% weight to weight absorbency.

EXAMPLE 2

1804 grams of Great Northern Paper Company sulfate based primary process sludge at 78.3% moisture was mixed with 2145.5 gms of parenchyma ray cells obtained from Proctor & Gamble Company at 81.1% moisture. The sludge and ray cells were homogenously mixed and size reduction was obtained in an Eirich RX-7 high intensity mixer at approximately 45% moisture content. The fiber size was 1-10 mm. During size reduction, Slime-Trol ® RX-41 biocide was added at 500 ppm. The mixture was then removed from the high intensity mixer and placed in a Mars mineral disc pelletizer for granule formation at approximately 55% moisture. The granules were removed from the pelletizer and dried in a pan-type oven dryer at 250° F., until the moisture content reached 2.68%. The bulk density of the product was found to be 18.9 lbs/cft. A screen analysis of the granules was conducted and the results are as follows:

| | U.S. Mesh | % Retained |
|---|---|---|
| | 6 | 4.32 |
| | 8 | 8.99 |
| | 12 | 38.68 |
| | 20 | 32.16 |
| | 30 | 9.33 |
| | 40 | 4.67 |
| | 60 | 1.76 |
| less than | 60 | 0.09 |

The granules were then tested for water and oil absorption, and were found to absorb 2.34 ml/gm on water, or 234% weight to weight absorbency. The granules absorbed 1.40 ml/gm of oil, or 122% weight to weight absorbency.

It is to be understood that the invention is not limited to details above given, but may be modified within the scope of the appended claims.

We claim:

1. A filler material for use as an oil and grease absorbent, said filler material comprising plant fiber granules, said granules including ray cells of at least 10% by weight of said granules.

2. The filler material of claim 1 wherein said granulated plant fiber is one of the group of materials which consists of citrus pulp, sugar cane, sugar beets, potatotes, grain and paper sludge.

3. The filler material of claim 1 and an incorporated biocide for controlling any bacteria and fungi in said filler material.

4. The filler material of claim 1 wherein said filler material is of a granular composition ranging from 6 to 60 mesh size.

5. A method of producing a filler material having oil and grease absorbent properties comprising the steps of:
   (a) providing a quantity of a plant fiber slurry;
   (b) adding ray cells at a quantity equal to or greater than 10% by weight of said slurry to form a mixture;
   (c) adjusting the moisture content of said mixture to allow fiber size reduction; and
   (d) reducing the fiber size of said mixture;
   (e) forming said mixture into granules; and
   (f) drying said granules.

6. The method of claim 5 wherein step (a) includes providing a quantity of paper sludge having 75%-99% fiber content by weight.

7. The method of claim 5 and a step (g) of adding a dye to adjust the color of said mixture.

8. The method of claim 7 and a step (h) of adding a biocide to said mixture.

9. The method of claim 8 and an additional step (i) of packaging said granules.

10. The method of claim 5 wherein step (a) includes providing a quantity of de-linked paper sludge having 40%-80% fiber content by weight.

11. The method of claim 9 wherein step (b) includes adding said ray cells at a ratio of 25%-75% slurry to 75% to 25% ray cells.

12. The method of claim 10 wherein step (b) includes adding said ray cells at a ratio of 50% slurry to 50% ray cells.

13. The method of claim 5 wherein step (e) includes agglomerating said mixture in a disk pelletizer.

14. The method of claim 5 wherein step (e) includes agglomerating said mixture in a drum pelletizer.

15. The method of claim 5 wherein step (d) includes reducing the fiber size of said mixture to a range of 1 mm-10 mm in length.

16. The method of claim 5 wherein step (d) includes shredding said mixture in a high intensity mixer.

* * * * *